United States Patent [19]

Gottling

[11] 4,040,437

[45] Aug. 9, 1977

[54] AUTOMATIC FLUID PRESSURE CUT-OFF SAFETY DEVICE

[75] Inventor: Helmut Gottling, Oberweser, Germany

[73] Assignee: WABCO Westinghouse GmbH, Hannover, Germany

[21] Appl. No.: 689,940

[22] Filed: May 25, 1976

[30] Foreign Application Priority Data

June 4, 1975 Germany ............................ 2524781

[51] Int. Cl.$^{2}$ ............................................... G05D 7/00

[52] U.S. Cl. .................................. 137/102; 137/596.1

[58] Field of Search ..................... 137/596.1, 102, 107; 91/424

[56] References Cited

U.S. PATENT DOCUMENTS

| | | | |
|---|---|---|---|
| 2,624,361 | 1/1953 | Brown | 137/102 |
| 3,042,061 | 7/1962 | Dobrikin | 137/102 |
| 3,183,040 | 5/1965 | Gold | 137/102 |
| 3,744,848 | 7/1973 | Hardwick et al. | 137/107 |

*Primary Examiner*—William R. Cline
*Assistant Examiner*—H. Jay Spiegel
*Attorney, Agent, or Firm*—R. S. Visk; R. W. McIntire, Jr.

[57] ABSTRACT

A fluid pressure cut-off safety device interposable in a fluid pressure supply pipe and operable responsively to a reduction of fluid pressure in the supply pipe to a predetermined degree for automatically cutting off communication through the supply pipe until such communication is restored by manual resetting of the device.

8 Claims, 3 Drawing Figures

AUTOMATIC FLUID PRESSURE CUT-OFF SAFETY DEVICE

BACKGROUND OF THE INVENTION

Certain types of machinery, such as a fluid pressure operable punch press, for example, inherently present risks of injury to the operator who must exercise extreme caution when operating such a machine. A situation, which may be dangerous to the operator, may occur during a contingent power failure, that is, an unexpected loss of operating fluid pressure or a reduction thereof to a degree insufficient for keeping the punch press operating. Unless some safety means is provided for preventing automatic resumption of operation of the punch press, a restoration of operating fluid pressure may cause the press to restart at such time that the operator may have his hands or other parts of his body in a position to be injured by such untimely restarting of the press.

SUMMARY OF THE INVENTION

The object of the present invention is to provide a safety device interposable in a fluid pressure supply pipe for automatically cutting off communication through said supply pipe, upon a reduction of pressure in said supply pipe below a certain degree, for preventing automatic restarting of the machine, if supplied with operating pressure via said pipe, until the safety device is manually reset for opening said communication.

Briefly the invention comprises a valve device interposable in a fluid pressure supply pipe via which operating pressure is supplied to a fluid pressure operable machine such as a punch press, for example, said valve device including a spring biased disc valve which is retained in an open position by pressure of fluid flowing through the valve device, so long as such pressure is at or in excess of a predetermined pressure, said disc valve being operable, upon reduction of said fluid pressure to a degree ineffective for operating the punch press, to a closed position for interrupting flow of operating fluid pressure through the valve device and maintaining such flow interruption until such time that the valve device is reset manually.

DESCRIPTION AND OPERATION

Figure 3:
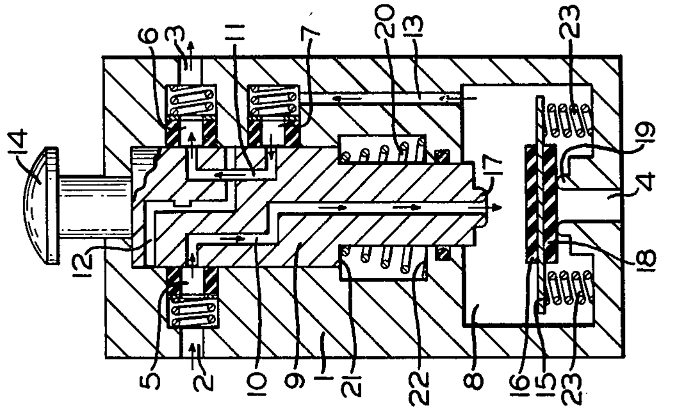
FIG. 3 is an elevational view, in section, of the safety device, as in FIGS. 1 and 2, shown in a second-stage open position.

As shown in the drawing, a fluid pressure cut-off safety device embodying the invention comprises a casing 1 having a fluid pressure supply port 2, connectable to a source of fluid under pressure (not shown), a fluid pressure delivery port 3 connectable to a fluid pressure operable machine such as a punch press (not shown), and an exhaust port 4 open to atmosphere.

Casing 1 also has formed therein a pressure supply chamber 5 open to supply port 2, a pressure delivery chamber 6 open to delivery port 3, a pressure relay chamber 7, and a pressure operating chamber 8 opening to exhaust port 4.

A slide valve member 9 is reciprocably coaxially disposed in casing 1 and has formed therein a supply passageway 10 via which supply chamber 5 is communicable with operating chamber 8, a delivery passageway 11 via which relay chamber 7 is communicable with delivery chamber 6, and a bypassing passageway 12 via which supply chamber 5 is communicable with relay chamber 7. A connecting passageway 13 formed in casing 1 constantly communicates relay chamber 7 with operating chamber 8.

An operating knob 14 extending exteriorly of casing 1 is secured to the upper end, as viewed in the drawing, of slide valve 9 for manually positioning said slide valve.

A disc valve member 15 is operably disposed in operating chamber 8 and is provided on the upper side thereof, as viewed in the drawing, with a supply control valve element 16 cooperable with an annular supply valve seat 17 surrounding the end of passageway 10 opening to operating chamber 8. An exhaust control valve element 18 is carried on the lower side of disc valve member 15 and is cooperable with an annular exhaust valve seat 19 surrounding the opening of exhaust port 4 into operating chamber 8.

Figure 2:
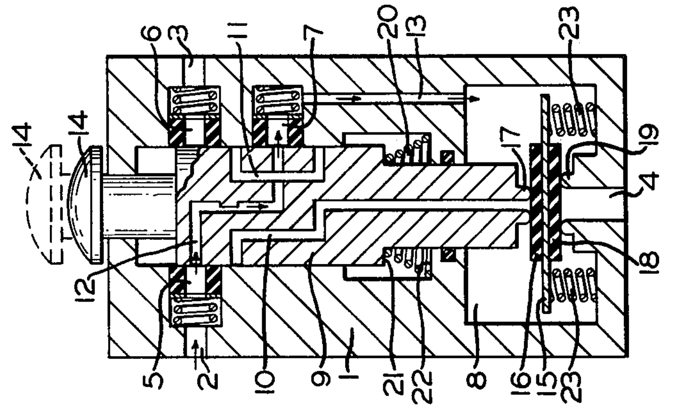
FIG. 2 is an elevational view, in section, of the safety device, as in FIG. 1, shown in a first-stage disposition toward an open position.

A return spring 20 compressibly disposed between a shoulder 21 formed on slide valve member 9 and a shoulder 22 formed in casing 1 urges said slide valve member upwardly toward an upper position to be more fully described hereinafter. A plurality of springs 23 are compressibly disposed between the lower end wall of casing 1 and the underside of disc valve member 15 for urging said disc valve member upwardly and, therefore, the control valve element 16 toward a seated or closed position on supply valve seat 17, as shown in FIGS. 1 and 2.

In considering the operation of the cut-off safety device, let it be assumed that supply port 2 is connected to a source of fluid normally at a certain predetermined operating pressure adequate for operating the punch press (not shown) which, it may be assumed, is connected to delivery port 3. It may be further assumed that the safety device is in a supply disposition, as shown in FIG. 3, so that slide valve member 9 is in its upper position in which supply passageway 10 places supply chamber 5 in communication with operating chamber 8. In the supply disposition of the safety device, the degree of fluid pressure acting in operating chamber 8 is sufficient for overcoming the opposing forces of spring 23, and, therefore, disc valve member 15 is retained in a supply position in which supply control valve element 16 is in an unseated or open position relative to seat 17, and exhaust valve element 18 is in a seated or closed position relative to valve seat 19.

Also, with slide valve member 9 in its upper position, bypassing passageway 12 is closed off at both ends, while delivery passageway 11 is in position to communicate relay chamber 7 with delivery chamber 6. Thus fluid pressure from supply port 2 may flow, as indicated by the arrows, from said supply port via supply passageway 10, operating chamber 8, connecting passageway 13, relay chamber 7, delivery passageway 11, and delivery chamber 6 to delivery port 3 and the punch press.

Figure 1:
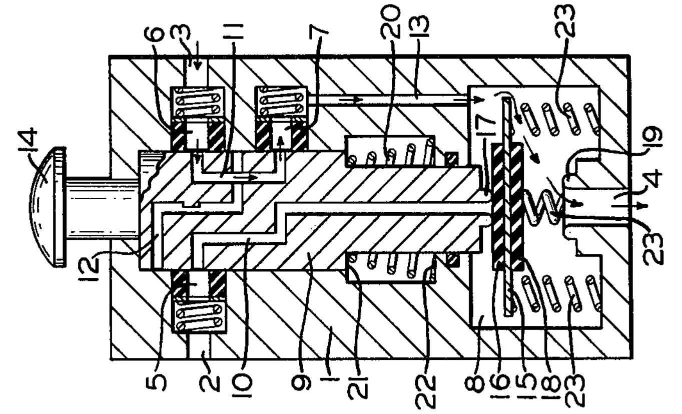
FIG. 1 is an elevational view, in section, of a safety device embodying the invention shown in a normally closed position.

If supply of fluid pressure at supply port 2, for any reason whatsoever, is either terminated or is reduced to a degree of pressure less than the predetermined operating pressure, the pressure in operating chamber 8 is correspondingly reduced, therefore rendering springs 23 effective for biasing disc valve member 15 to a closed-exhaust position in which it is shown in FIG. 1 and in which valve element 16 occupies a seated or closed position relative to valve seat 17, while valve element 18 occupies an unseated or open position relative to valve seat 19. Thus, communication between supply passageway 10 and operating chamber 8 is cut-off.

Slide valve member 9 remains in its upper position so that fluid pressure from the punch press is exhausted to atmosphere, as indicated by the arrows in FIG. 1, via delivery port 3, delivery chamber 6, delivery passageway 11, relay chamber 7, connecting passageway 13, operating chamber 8 and exhaust port 4. Under these conditions the safety device may be said to be in a closed-exhaust disposition.

Notwithstanding that fluid pressure at supply port 2 may be restored to the normal predetermined operating pressure while the safety device is in its closed-exhaust disposition, as shown in FIG. 1, the device, according to the invention will remain in said disposition until the operator takes certain measures about to be described. The force of the increased or restored pressure acting on the area of valve element 16 within valve seat 17 is insufficient for overcoming the opposing forces of springs 23. Therefore, disc valve member 15 remains in the closed-exhaust position.

In order to set the punch press in operation again, the operator must push knob 14 downwardly out of a normal position corresponding to the upper position of valve member 9 to cause corresponding downward movement of said valve member to a lower position in which it is shown in FIG. 2 and in which both ends of delivery passageway 11 are closed off and supply passageway 10 is closed off from supply chamber 5. With slide valve member 9 in its lower position, disc valve member 15 occupies a neutral position in which both valve elements 16 and 18 are seated on valve seats 17 and 19, respectively. Under these conditions, the safety device may be said to be in a neutral disposition, as shown in FIG. 2.

In the neutral disposition of the safety device and, therefore, in the lower position of slide valve member 9, bypassing passageway 12 places supply chamber 5 in communication with relay chamber 7 which, in turn, is in communication with operating chamber 8 via connecting passageway 13. Fluid at the restored degree of operating pressure may thus flow, as indicated by the arrows in FIG. 2, from supply port 2 via supply chamber 5, bypassing passageway 12, relay chamber 7 and connecting passageway 13 to operating chamber 8, where such pressure may build up to a degree sufficient for overcoming the forces of springs 23.

Although the pressure building up in operating chamber 8 equalizes on both sides of disc valve member 15, that portion of pressure area on the under side of said disc valve member surrounded by exhaust valve seat 19 is isolated from such pressure build-up, thereby establishing a pressure differential across the two sides of the valve member, resulting in a downwardly directed pressure differential force. Springs 23 are preselected such that the total force exerted upwardly thereby in opposition to the downwardly directly differential pressure force is less than said differential pressure force when such pressure has attained a degree equivalent to the predetermined operating pressure, above defined. Disc valve member 15 will, therefore, be maintained in its seated position on exhaust valve seat 19, and knob 14 may be released, whereby return spring 20 is effective for returning slide valve member 9 to its upper position and the safety device itself to the supply disposition, as shown in FIG. 3.

With slide valve 9 restored to its upper position, the bypassing communication between supply chamber 5 and relay chamber 7 via bypassing passageway 12 is interrupted, and supply of operating fluid pressure to the punch press is reestablished, as indicated by the arrows in FIG. 3, via supply chamber 5, supply passageway 10, operating chamber 8, connecting passageway 13, relay chamber 7, delivery passageway 11, delivery chamber 6, and delivery port 3.

It should be apparent that the cut-off safety device herein disclosed in tamper proof so that its purpose cannot be defeated either by securing knob 14 in its normal position, as shown in FIG. 1, or in its downward position, as shown in FIG. 2. If knob 14 is secured in its upper normal position, the safety device functions, as above described, to assume the closed-exhaust disposition, as shown in FIG. 1, in which supply of operating pressure to the punch press is cut off and residue pressure at the punch press is exhausted via port 4. If knob 14 is secured in its downward position, it is obvious that operating pressure cannot reach the punch press as long as supply passageway 10 is cut off from supply chamber 5 and delivery passageway 11 is cut off from delivery chamber 6.

Although the number of springs 23 provided in the cut-off safety device is not necessarily critical to the operation of the device, as long as the total force exerted by said springs meets the conditions hereinabove explained, the device is preferably provided with three such springs and arranged so as to make contact adjacent the periphery of disc valve member 15. This arrangement provides a certain amount of automatic operation of the safety device even if one of the three springs 23 should break.

Even with the degree of pressure in operating chamber 8 at the predetermined operating pressure or higher, should one of springs 23 break, the safety device will operate to terminate supply of operating pressure to the punch press and consequently terminate operation thereof, because the disc valve member 15 would be tilted by the remaining two springs, which would keep exhaust valve element 18 from seating on valve seat 19. Thus, operating pressure in chamber 8 would escape via exhaust port 4 rather than flow to the punch press. The safety device itself could not be restored to normal operation until the broken spring 23 was replaced.

Having now described the invention what I claim as new and desire to secure by Letters Patent, is:

1. A fluid pressure cut-off safety device interposable in a fluid pressure supply pipe via which operating fluid at a predetermined operating pressure may be supplied to a fluid pressure operable device, said safety device comprising:
   a. a casing having formed therein a fluid pressure supply port normally supplied with operating fluid at a certain predetermined pressure, a fluid pressure delivery port via which operating fluid pressure is deliverable to the fluid pressure operable device, an exhaust port open to atmosphere, and a fluid pressure operating chamber;
   b. first valve means in said casing effective in one position for opening a fluid pressure supply communication between said supply port and said delivery port via said operating chamber and concurrently closing with a second valve means an exhaust communication between said delivery port and said exhaust port, or for alternatively closing with said second valve means said supply communication and concurrently opening said exhaust communication via said operating chamber;

c. said first valve means being operable to a different position in which both said supply and exhaust communications are concurrently closed;

d. said second valve means operable responsively to fluid in said operating chamber, at said certain pressure or greater, to a first position in which, and cooperatively with said first valve means in its said one position, said supply communication is open and said exhaust communication is concurrently closed;

e. said second valve means being operable, in response to a reduction of fluid pressure in said operating chamber to a pressure less than said certain pressure, to a second position in which, and cooperatively with said first valve means in its said one position, said supply communication is closed and said exhaust communication is concurrently open;

f. operating means carried by said first valve means and yieldable to manual force effecting concurrent operation of said first valve means and said second valve means to said different and said first positions, respectively, in which positions said first and said second valve means are cooperatively effective for closing both said supply and exhaust communications; and g. biasing means for restoring said first valve means to its said one position upon release of said manual force subsequently to restoration of fluid pressure in said operating chamber to said certain pressure or greater for retaining said second valve means in its said first position.

2. A fluid pressure cut-off safety device, as set forth in claim 1, wherein said first valve means comprises a slide valve member, and said supply communication comprises a supply passageway and a delivery passageway, both formed in said slide valve member, and a connecting passageway formed in said casing with one end open to said operating chamber, and wherein said supply, delivery and connecting passageways, with said pressure chamber, are all serially communicated with each other between said supply port and said delivery port when said first valve means is in its said one position and said second valve means is in its said first position.

3. A fluid pressure cut-off safety device, as set forth in claim 2 wherein said supply passageway, with said second valve means in its said second position, is cut off from said operating chamber, connecting passageway and delivery passageway, and wherein said exhaust communication comprises said delivery passageway, connecting passageway, operating chamber and exhaust port, via which exhaust communication said delivery port and the fluid pressure operable device connectable thereto are vented to atmosphere, when said second valve means is in its said second position.

4. A fluid pressure cut-off safety device, as set forth in claim 2, further characterized by a bypassing passageway formed in said slide valve member for communicating said supply port with said connecting passageway and the operating chamber when said first valve means and said second valve means are in their different and first positions, respectively.

5. A fluid pressure cut-off safety device, as set forth in claim 4, wherein said casing also has formed therein a pressure relay chamber to which the other end of said connecting passageway opens, and via which the delivery passageway is communicated with the connecting passageway in said one position of the slide valve member, and, alternatively, via which the bypassing passageway is communicated to said connecting passageway in said different position of the slide valve member.

6. A fluid pressure cut-off safety device, as set forth in claim 1 wherein said second valve means comprises a disc valve member and spring means for urging said disc valve member toward its said second position.

7. A fluid pressure cut-off safety device, as set forth in claim 6, wherein said spring means comprises a plurality of springs acting on said disc valve member in an opposing relation to said manual force and to the pressure in said operating chamber acting thereon.

8. A fluid pressure cut-off safety device, as set forth in claim 7, wherein said plurality of springs comprises three coil springs compressedly interposed between one end of said casing and the facing side of said disc valve member adjacent and in equi-angularly spaced relation relative to the periphery of the disc valve member.

* * * * *